US010376777B2

United States Patent
Shiina et al.

(10) Patent No.: US 10,376,777 B2
(45) Date of Patent: Aug. 13, 2019

(54) INFORMATION PROCESSOR, CONTROL METHOD OF INFORMATION PROCESSOR, PROGRAM, AND INFORMATION STORAGE MEDIUM

(71) Applicant: Sony Computer Entertainment Inc., Tokyo (JP)

(72) Inventors: Hiroshi Shiina, Tokyo (JP); Toshikazu Iwasa, Kyoto (JP)

(73) Assignee: Sony Interactive Entertainment Inc., Tokyo (JP)

( * ) Notice: Subject to any disclaimer, the term of this patent is extended or adjusted under 35 U.S.C. 154(b) by 28 days.

(21) Appl. No.: 14/898,611

(22) PCT Filed: Jun. 26, 2014

(86) PCT No.: PCT/JP2014/067049
§ 371 (c)(1),
(2) Date: Dec. 15, 2015

(87) PCT Pub. No.: WO2014/208689
PCT Pub. Date: Dec. 31, 2014

(65) Prior Publication Data
US 2016/0129344 A1    May 12, 2016

(30) Foreign Application Priority Data

Jun. 26, 2013  (JP) .................................. 2013-134188

(51) Int. Cl.
*A63F 9/24*        (2006.01)
*A63F 13/211*    (2014.01)
(Continued)

(52) U.S. Cl.
CPC ............ *A63F 13/211* (2014.09); *A63F 13/21* (2014.09); *A63F 13/213* (2014.09); *A63F 13/30* (2014.09);
(Continued)

(58) Field of Classification Search
CPC ...... A63F 13/211; A63F 13/213; A63F 13/42; A63F 13/837; A63F 13/30; A63F 13/21; A63F 13/428
See application file for complete search history.

(56) References Cited

U.S. PATENT DOCUMENTS 8,469,824 B1 *   6/2013  Farley ................. F41J 5/02
                                                            434/11
2002/0091003 A1 *  7/2002  Beken ................. A63F 13/08
                                                            472/60
(Continued)

FOREIGN PATENT DOCUMENTS

CN      202427156 U      9/2012
EP      1757344 A1       2/2007
(Continued)

OTHER PUBLICATIONS

EVE-VR: Oculus Rift View Demo. Youtube.com. Online. Jun. 6, 2013. Accessed via the Internet. Accessed Mar. 29, 2017. <URL: https://www.youtube.com/watch?v=fdU-f456N-E>.*
(Continued)

*Primary Examiner* — Dmitry Suhol
*Assistant Examiner* — Carl V Larsen
(74) *Attorney, Agent, or Firm* — Matthew B. Dernier, Esq.

(57) ABSTRACT

An information processor determines data content to be transmitted and a destination device to which to transmit the data on the basis of the posture of the information processor identified on the basis of detection results of a sensor adapted to detect the posture thereof, a control method of an information processor, a program, and an information storage medium. A game process execution section determines a transmission destination device on the basis of the posture of the information processor identified on the basis of detection results of the sensor. A missile data generation
(Continued)

section determines data content to be transmitted to the transmission destination device on the basis of the posture of the information processor identified on the basis of detection results of the sensor at a time different from when the transmission destination device is determined. A missile data transmission section transmits the data to the transmission destination device.

10 Claims, 16 Drawing Sheets

(51) Int. Cl.
*A63F 13/428* (2014.01)
*A63F 13/30* (2014.01)
*A63F 13/21* (2014.01)
*A63F 13/837* (2014.01)
*A63F 13/213* (2014.01)
*A63F 13/42* (2014.01)

(52) U.S. Cl.
CPC ............ *A63F 13/42* (2014.09); *A63F 13/428* (2014.09); *A63F 13/837* (2014.09)

(56) References Cited

U.S. PATENT DOCUMENTS

| 2002/0111201 | A1* | 8/2002 | Lang ................. A63F 13/12 463/2 |
| 2007/0021203 | A1* | 1/2007 | Edwards ............ A63F 13/10 463/30 |
| 2011/0151955 | A1* | 6/2011 | Nave ................. A63F 13/837 463/2 |
| 2012/0052952 | A1 | 3/2012 | Nishida |
| 2012/0086728 | A1* | 4/2012 | McArdle ............ G06F 3/0481 345/633 |
| 2012/0108305 | A1 | 5/2012 | Akiyama |
| 2012/0229516 | A1* | 9/2012 | Matsunaga .......... A63F 13/26 345/659 |
| 2013/0065692 | A1 | 3/2013 | Aronzon |
| 2018/0043263 | A1* | 2/2018 | Cao ................... H04W 4/026 |

FOREIGN PATENT DOCUMENTS

| EP | 2497544 A2 | 9/2012 |
| JP | 2008272123 A | 11/2008 |
| JP | 2010063616 A | 3/2010 |
| WO | 2011019049 A1 | 2/2011 |
| WO | 2013039777 A2 | 3/2013 |

OTHER PUBLICATIONS

Lemne, Bengt. EVE-VR Hands-On. Gamerreactor.eu. Online. Jun. 19, 2013. Accessed via the Internet. Accessed Mar. 29, 2017. <URL: http://www.gamereactor.eu/previews/81151/EVE-VR+Hands-On/>.*
Benson, Julian. CCP reveal EVR: a 6v6 space dogfighting game built for the Oculus Rift. PCGamesN.com. Online. Apr. 26, 2013. Accessed via the Internet. Accessed Apr. 1, 2017. <URL: https://www.pcgamesn.com/eve/eve-online-oculus-rift-game-evr>.*
Oculus Rift. Wikipedia.com. Online. Jun. 8, 2013. Accessed via the Internet. Accessed Apr. 1, 2017. <https://web.archive.org/web/20130608092201/http://en.wikipedia.org/wiki/Oculus_Rift>.*
Nintendo 3DS—Face Raiders Gameplay. Youtube.com. Online. Feb. 26, 2011. Accessed via the Interent. Accessed Mar. 19, 2018. <URL: https://www.youtube.com/watch?v=PvFl0od6dpl>.*
Nintendo 3DS. Wikipedia.com. Online. Accessed via the Internet. Accessed Mar. 19, 2018. <URL: https://en.wikipedia.org/wiki/Nintendo_3DS>.*
Camera Lock on. tvtropes.org. Online. Jan. 8, 2012. Accessed via the Internet. Accessed Mar. 6, 2019. <URL: https://web.archive.org/web/20120108074924/https://tvtropes.org/pmwiki/pmwiki.php/Main/CameraLockOn> (Year: 2012).*
International Searc Report for corresponding PCT Application No. PCT/JP2014/067049, 1 page, dated Aug. 5, 2014.
European Search Report for corresponding EP Application No. 14817896.5, 9 page, dated Jan. 18, 2017.
Search Report for corresponding CN Application No. 201480034873. 2, 13 page, dated Oct. 24, 2017.

* cited by examiner

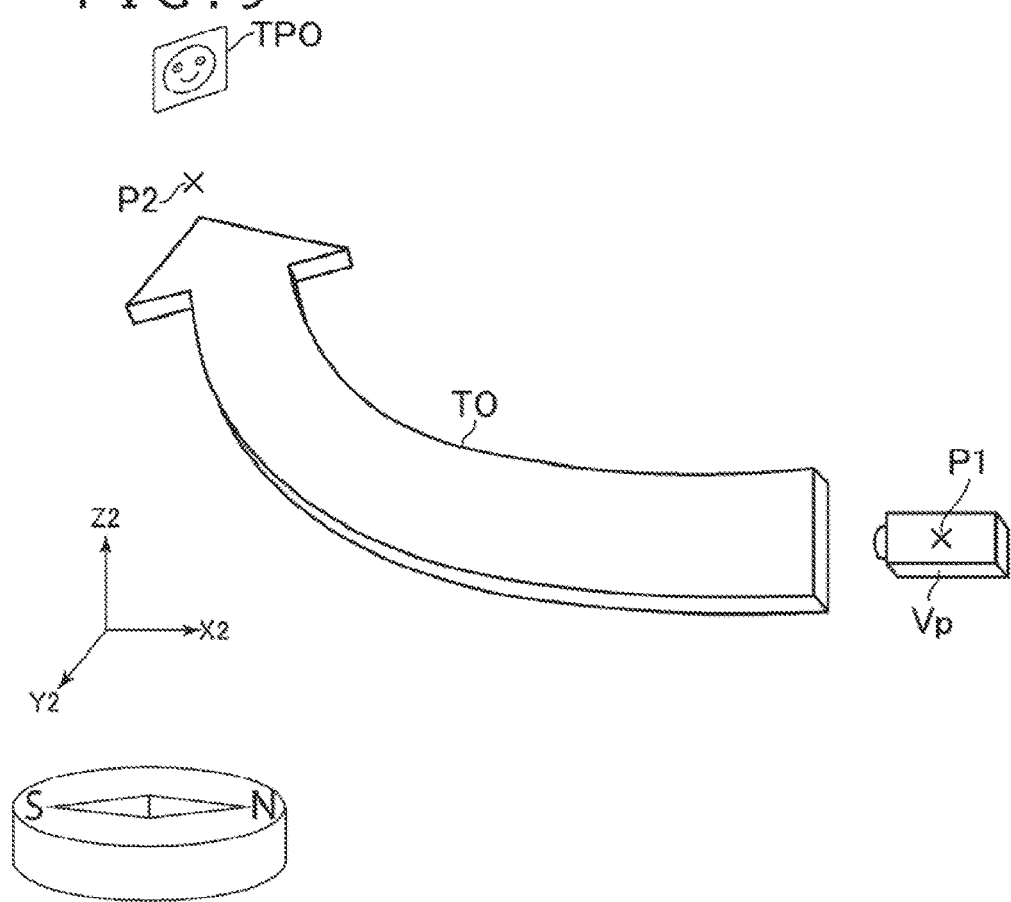

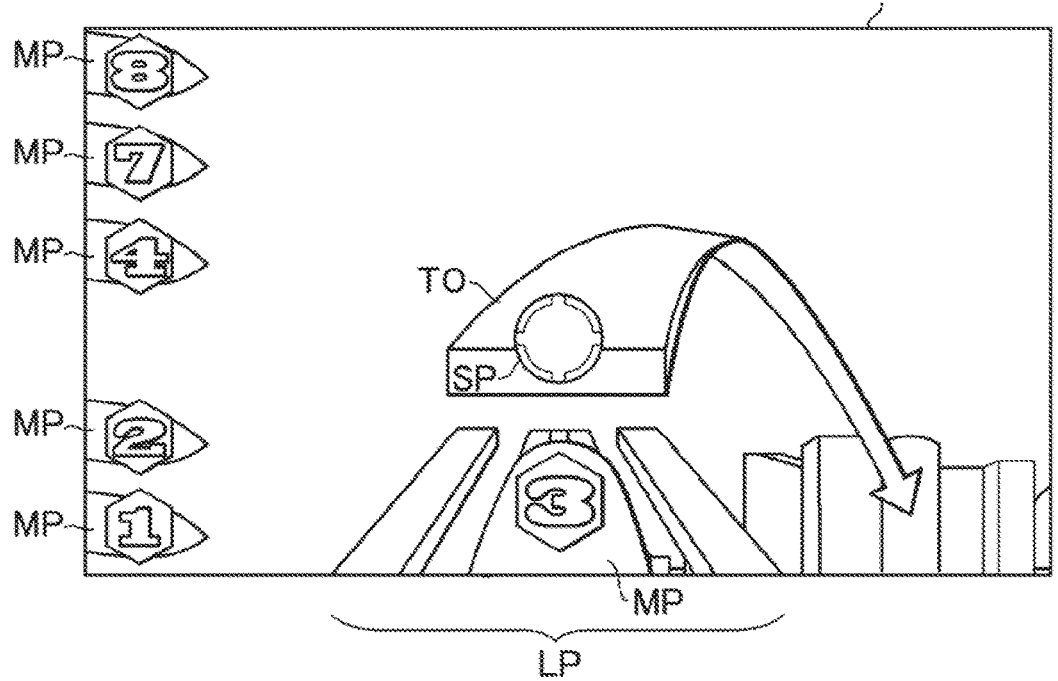

INFORMATION PROCESSOR, CONTROL METHOD OF INFORMATION PROCESSOR, PROGRAM, AND INFORMATION STORAGE MEDIUM

TECHNICAL FIELD

The present invention relates to an information processor, a control method of an information processor, a program, and an information storage medium.

BACKGROUND ART

Portable information processors are available each of which includes a sensor for detecting its posture such as gyro sensor, motion sensor (acceleration sensor), or electronic compass. Some of these information processors identify their postures on the basis of sensor's detection results and transmit data to a device present in the orientation identified on the basis of the postures of the information processors as seen from the positions thereof.

SUMMARY

Technical Problem

In related arts allow for determination, on the basis of sensor's detection results, of a transmission destination device, but not data content. Therefore, it has been necessary for a user to enter data content to be transmitted, for example, via operation keys or a touch panel. This is cumbersome for the user. Here, if data content to be transmitted can also be determined on the basis of the posture of the information processor, the user can determine a transmission destination device and data content to be transmitted in a seamless manner, thus contributing to improved ease of use for the user.

The present invention has been devised in light of the foregoing, and it is an object of the present invention to provide an information processor that allows for determination of data content to be transmitted and a destination device to which to transmit the data content on the basis of the posture of the information processor identified on the basis of detection results of a sensor adapted to detect the posture thereof, a control method of an information processor, a program, and an information storage medium.

Solution to Problem

In order to solve the above problem, an information processor according to the present invention has a sensor detecting a posture thereof. The information processor includes a transmission destination device determination section, a transmission data determination section, and a transmission section. The transmission destination device determination section determines a transmission destination device on a basis of the posture of the information processor identified on a basis of detection results of the sensor. The transmission data determination section determines data content to be transmitted to the transmission destination device on the basis of the posture of the information processor identified on the basis of detection results of the sensor at a time different from when the transmission destination device is determined. The transmission section transmits the data to the transmission destination device.

Further, a control method of an information processor according to the present invention is a control method of an information processor having a sensor detecting a posture thereof. The control method includes a step of determining a transmission destination device on a basis of the posture of the information processor identified on a basis of detection results of the sensor. The control method of the information processor includes another step of determining data content to be transmitted to the transmission destination device on the basis of the posture of the information processor identified on the basis of detection results of the sensor at a time different from when the transmission destination device is determined. The control method of the information processor includes still another step of transmitting the data to the transmission destination device.

Still further, a program according to the present invention causes a computer having a sensor detecting a posture thereof to execute a step of determining a transmission destination device on a basis of the posture of the computer identified on a basis of detection results of the sensor. The program further causes the computer to execute a step of determining data content to be transmitted to the transmission destination device on the basis of the posture of the computer identified on the basis of detection results of the sensor at a time different from when the transmission destination device is determined. The program still further causes the computer to execute a step of transmitting the data to the transmission destination device.

Still further, another information processor according to the present invention has a sensor detecting a posture thereof. The information processor includes a reception section, a posture identification section, and a process execution section. The reception section receives data from a transmitter. The posture identification section identifies the posture of the information processor on a basis of detection results of the sensor. The process execution section performs a process appropriate to the received data and the identified posture of the information processor. The transmitter has a sensor detecting a posture thereof. The transmitter includes a transmission destination device determination section, a transmission data determination section, and a transmission section. The transmission destination device determination section determines a transmission destination device on a basis of the posture of the transmitter identified on the basis of detection results of the sensor of the transmitter. The transmission data determination section determines data content to be transmitted to the transmission destination device on the basis of the posture of the transmitter identified on the basis of detection results of the sensor at a time different from when the transmission destination device is determined. The transmission section transmits the data to the transmission destination device.

Still further, another control method of an information processor according to the present invention is a control method of an information processor having a sensor detecting a posture thereof. The control method includes a step of receiving data from a transmitter. The control method includes another step of identifying the posture of the information processor on a basis of detection results of the sensor. The control method includes still another step of performing a process appropriate to the received data and the identified posture of the information processor. The transmitter has a sensor detecting a posture thereof. The transmitter includes a transmission destination device determination section, a transmission data determination section, and a transmission section. The transmission destination device determination section determines a transmission destination device on a basis of the posture of the transmitter identified on the basis of detection results of the sensor of the transmitter. The transmission data determination section determines data content to be transmitted to the transmission destination device on the basis of the posture of the transmitter identified on the basis of detection results of the sensor at a time different from when the transmission destination device is determined. The transmission section transmits the data to the transmission destination device.

Still further, another program according to the present invention causes a computer having a sensor detecting a posture thereof to execute a step of receiving data from a transmitter. The program further causes the computer to execute a step of identifying the posture of the computer on a basis of detection results of the sensor. The program still further causes the computer to execute a step of performing a process appropriate to the received data and the identified posture of the computer. The transmitter has a sensor detecting a posture thereof. The transmitter includes a transmission destination device determination section, a transmission data determination section, and a transmission section. The transmission destination device determination section determines a transmission destination device on a basis of the posture of the transmitter identified on the basis of detection results of the sensor of the transmitter. The transmission data determination section determines data content to be transmitted to the transmission destination device on the basis of the posture of the transmitter identified on the basis of detection results of the sensor at a time different from when the transmission destination device is determined. The transmission section transmits the data to the transmission destination device.

Still further, the program can be stored in a computer-readable information storage medium.

In the present invention, a transmission destination device is determined on the basis of the posture of an information processor identified on the basis of detection results of a sensor of the information processor. Then, data content to be transmitted to the transmission destination device is determined on the basis of the posture of the information processor identified on the basis of detection results of the sensor at a time different from when the transmission destination device is determined. Thus, the present invention allows for determination of data content to be transmitted and a transmission destination device on the basis of the posture of the information processor identified on the basis of detection results of a sensor adapted to detect the posture thereof.

In an embodiment of the present invention, the transmission data determination section determines data content to be transmitted to the transmission destination device on the basis of the posture identified on the basis of detection results of the sensor at a time different from when the transmission destination device is determined.

In another embodiment of the present invention, the information processor further includes a positioning section. The transmission destination device determination section determines, from among a plurality of devices, a transmission destination device based not only on the relationship, identified for each of the plurality of devices, between the position of each of the plurality of devices and the position of the information processor identified on the basis of positioning results of the positioning section but also on the posture identified on the basis of detection results of the sensor.

In the present embodiment, the transmission destination device determination section may determine, from among a plurality of devices, a transmission destination device based not only on the direction of orientation, identified for each of the plurality of devices, from the position of the information processor toward the position of each of the plurality of devices but also on the direction corresponding to the posture identified on the basis of detection results of the sensor.

Further, in still another embodiment of the present invention, the information processor further includes an imaging section. The transmission destination device determination section determines a transmission destination device on the basis of the imaging direction of the imaging section identified on the basis of detection results of the sensor.

BRIEF DESCRIPTION OF DRAWINGS

FIG. 9 is a diagram illustrating an example of a virtual space.

FIG. 10 is a diagram illustrating an example of a play image.

FIG. 11 is a diagram illustrating an example of a missile data structure.

DESCRIPTION OF EMBODIMENT

A detailed description will be given below of an embodiment of the present invention on the basis of the accompanying drawings.

Figure 1:
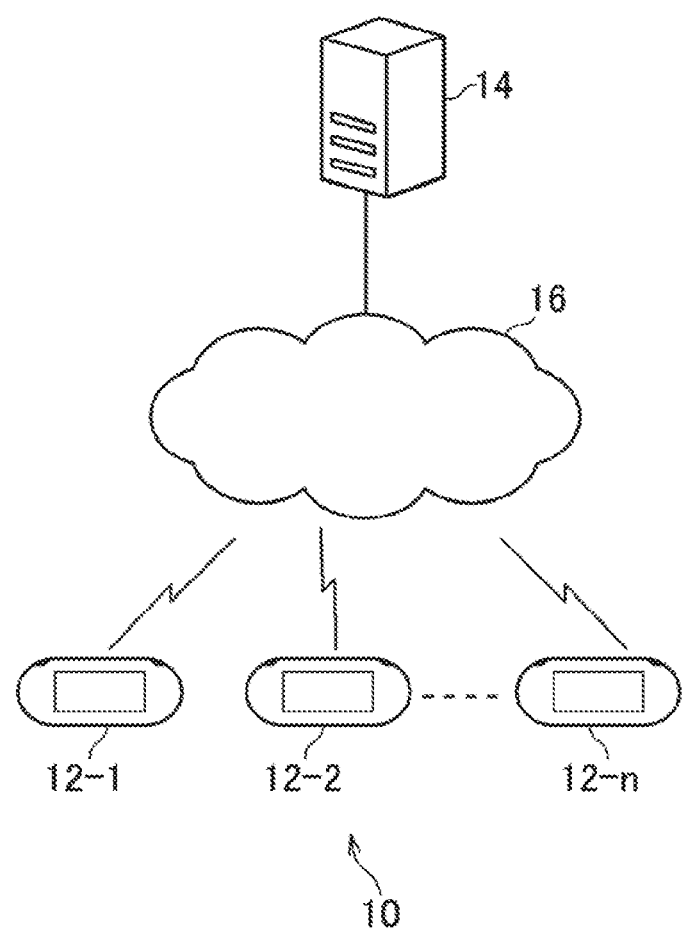
FIG. 1 is a diagram illustrating an example of an overall configuration of an information processing system according to an embodiment of the present invention.

FIG. 1 is a diagram illustrating an example of an overall configuration of an information processing system 10 according to an embodiment of the present invention. As illustrated in FIG. 1, the information processing system 10 includes, for example, information processors 12 (12-1, 12-2, . . . , and 12-n), and a server 14. The information processors 12 and the server 14 are connected to a computer network 16 such as the Internet so that they can communicate with each other.

The server 14 according to the present embodiment is, for example, a server computer adapted to relay data between the information processors 12.

Figure 2A:
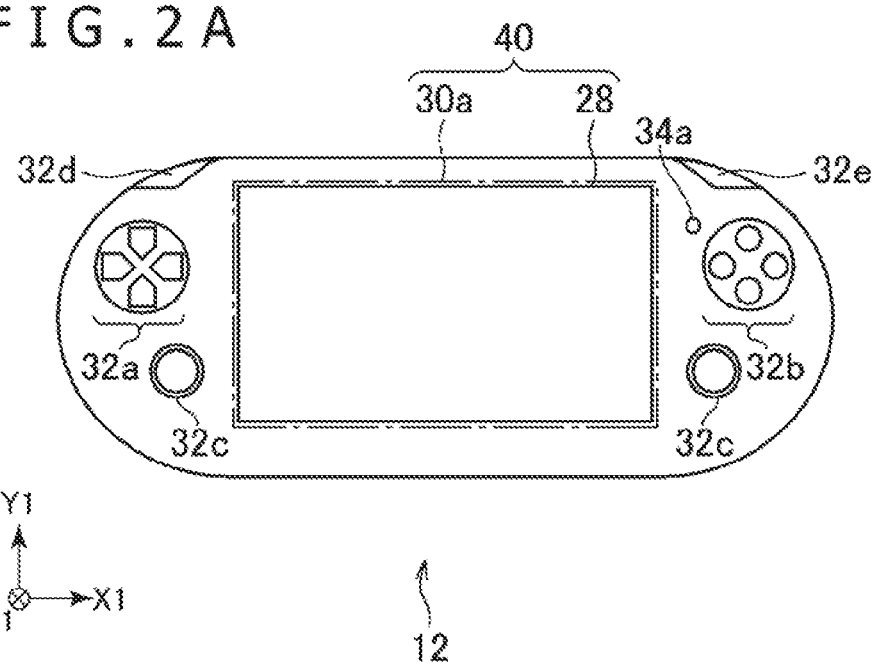
FIG. 2A is a front view illustrating an example of appearance of an information processor according to the embodiment of the present invention.
Figure 2B:
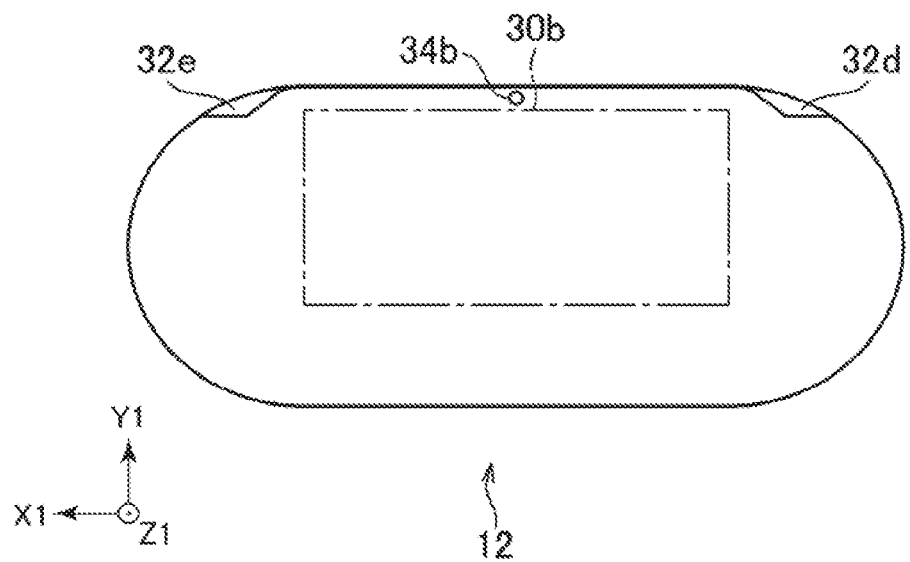
FIG. 2B is a rear view illustrating an example of appearance of the information processor according to the embodiment of the present invention.
Figure 3:
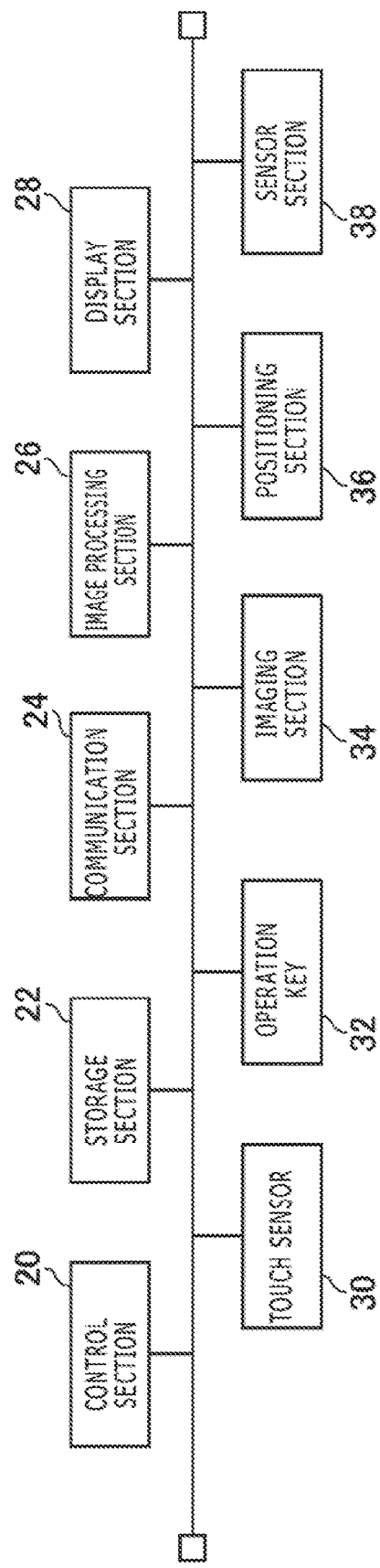
FIG. 3 is a configuration diagram illustrating an example of a hardware configuration of the information processor according to the embodiment of the present invention.

FIG. 2A is a front view illustrating an example of appearance of the information processor 12 according to the present embodiment. FIG. 2B is a rear view illustrating an example of appearance of the information processor 12 shown in FIG. 2A. FIG. 3 is a configuration diagram illustrating an example of a hardware configuration of the information processor shown in FIGS. 2A and 2B. We assume that the information processor 12 according to the present embodiment is, for example, a transportable device such as portable game console.

The housing of the information processor 12 according to the present embodiment is in the shape of a flat plate as a whole. In the description given below, the horizontal direction (direction along the width) of the housing is the X1-axis direction, the vertical direction (direction along the height) thereof is the Y1-axis direction, and the thickness direction (depth direction) thereof is the Z1-axis direction. Further, in the present embodiment, the direction from left to right as seen from front of the housing is the positive X1-axis direction, the direction from bottom to top as seen from front of the housing is the positive Y1-axis direction, and the direction from front to rear of the housing is the positive Z1-axis direction. As illustrated in FIGS. 2A, 2B, and 3, the information processor 12 according to the present embodiment includes a control section 20, a storage section 22, a communication section 24, an image processing section 26, a display section 28, a touch sensor 30, operation keys 32, an imaging section 34, a positioning section 36, a sensor section 38, and so on. These elements are connected together via a bus.

The control section 20 is, for example, a CPU and handles a variety of information processing tasks in accordance with the program stored in the storage section 22.

The storage section 22 includes memory elements such as RAM and ROM and stores a program executed by the control section 20 and a variety of data.

The communication section 24 transmits information to the other information processors 12 and the server 14 on the Internet in accordance with an instruction supplied from the control section 20. Further, the communication section 24 outputs received information to the control section 20. The communication section 24 according to the present embodiment includes, for example, a mobile phone communication module and a wireless LAN module. The mobile phone communication module is designed to achieve data communication using a mobile phone network. The wireless LAN module is designed to achieve data communication using a wireless LAN.

The image processing section 26 includes, for example, a GPU and a frame buffer memory and draws an image to be displayed on the display section 28 in accordance with an instruction output from the control section 20. As a specific example, the image processing section 26 includes a frame buffer memory appropriate to the display region of the display section 28, and the GPU writes an image to the frame buffer memory at given time intervals in accordance with an instruction from the control section 20. Then, the image written in the frame buffer memory is converted into a video signal at a given time and displayed on the display section 28.

The display section 28 is, for example, one of a variety of image display devices such as liquid-crystal display panel and organic EL display panel.

The touch sensor 30 is a sensor adapted to sequentially detect contact of an object (e.g., finger) on the detection face at given time intervals. The information processor 12 according to the present embodiment includes the two touch sensors 30 (front and rear touch sensors 30a and 30b). On the front face of the housing of the information processor 12 according to the present embodiment, a touch panel 40 is provided which includes the display section 28 and the front touch sensor 30a that are combined into a single piece. Any type of device such as capacitive, pressure-sensitive, or optical device, can be used as the touch sensor 30 according to the present embodiment so long as the device can detect the position of an object on the detection face.

The operation keys 32 are a kind of operation section used by a user to make an operation input to the information processor 12. The operation keys 32 according to the present embodiment include, for example, directional keys 32a, a group of buttons 32b, analog sticks 32c, an L button 32d, an R button 32e, and so on. The directional keys 32a are arranged on the left side of the front face of the housing. The group of buttons 32b are arranged on the right side of the front face of the housing. The analog sticks 32c are arranged, one on the left side and the other on the right side of the front face of the housing. The L button 32d is arranged on the left side of the upper side face of the housing as seen from the front face of the housing. The R button 32e is arranged on the right side of the upper side face of the housing as seen from the front face of the housing.

The imaging section 34 is a camera adapted to output a captured image of a subject to the information processor 12. The information processor 12 according to the present embodiment has the two imaging sections 34. The imaging section 34 provided on the front face of the housing will be referred to as a front imaging section 34a, and that provided on the rear face of the housing as a rear imaging section 34b.

The positioning section 36 is a device adapted to measure the position (latitude and longitude) of the information processor 12 using a global positioning system (GPS).

The sensor section 38 is a device adapted to detect the posture of the information processor 12. The sensor section 38 according to the present embodiment includes, for example, a three-axis gyro sensor, a three-axis motion sensor (three-axis acceleration sensor), and an electronic compass. The sensor section 38 according to the present embodiment can not only identify the change of the posture of the information processor but also identify the direction in which the information processor 12 is oriented.

In the present embodiment, a variety of data is exchanged between the information processors 12 via the server 14.

Then, in the present embodiment, data to be transmitted and the information processor 12 to which to transmit the data are determined on the basis of the posture of the information processor 12 identified on the basis of detection results of the sensor section 38.

A description will be given below of data exchange between the information processors 12 in a shooting game in which the user of the information processor 12 participates as an example of data exchange between the information processors 12 according to the present embodiment. In the shooting game, a plurality of players fire virtual missiles at each other, and the one who has sustained the least damage is the winner.

In the present embodiment, we assume that three or more players participate in a shooting game. A description will be given below of a scene in which a first player of these players fires virtual missiles at a second player as the other player. The first player uses a first information processor 12-1, and the second player uses a second information processor 12-2.

Figure 4:
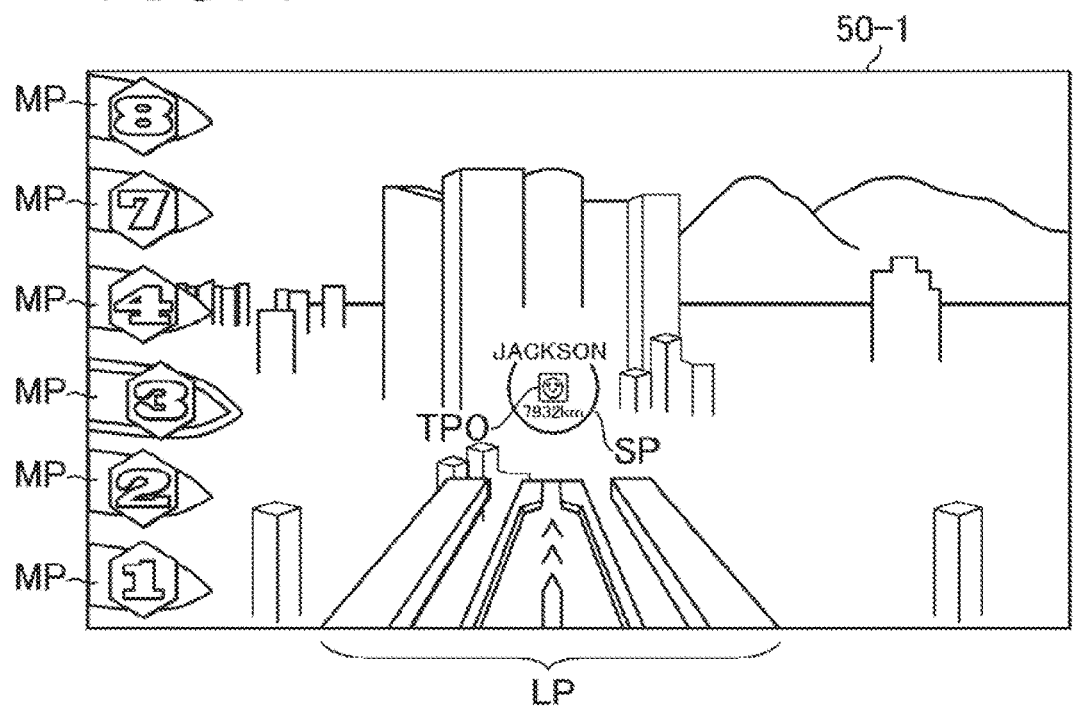
FIG. 4 is a diagram illustrating an example of a play image.

In the present embodiment, a play image 50-1 illustrated in FIG. 4 appears on the display sections 28 of the information processors 12 of the players participating in the shooting game. FIG. 4 is a diagram illustrating an example of the play image 50-1 appearing on the display section 28 of the first information processor 12-1. Then, in the present embodiment, the play image 50-1 appearing on the display sections 28 is updated at given time intervals (e.g., every 1/60 of a second).

Figure 5:
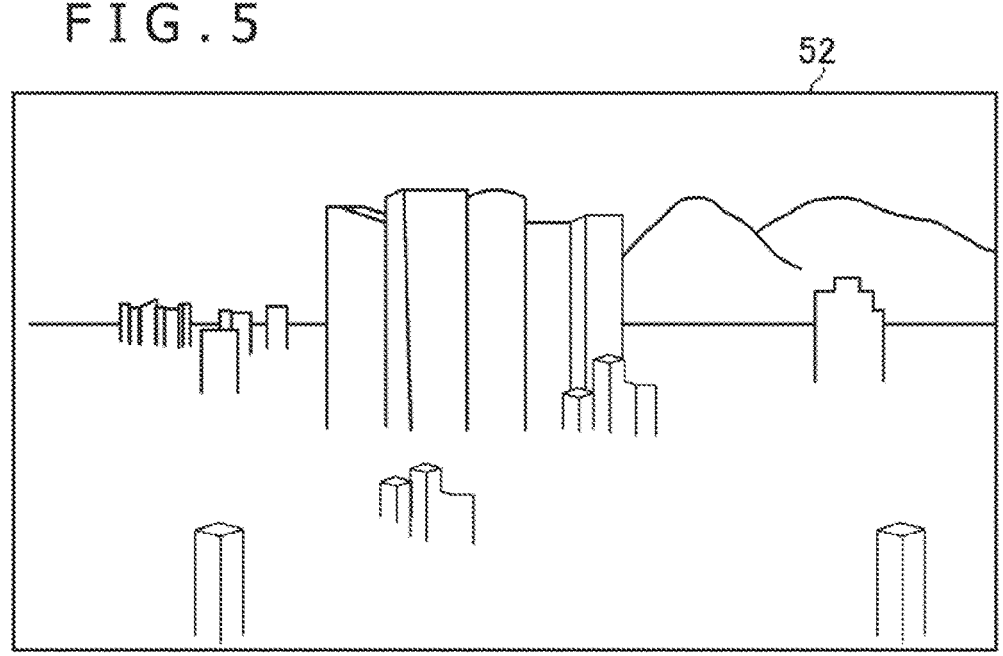
FIG. 5 is a diagram illustrating an example of a captured image.

The play image 50-1 includes a captured image 52, captured by the rear imaging section 34b and illustrated in FIG. 5, as a background. In the present embodiment, the rear imaging section 34b generates the captured image 52 at given time intervals (e.g., every 1/60 of a second). In the present embodiment, the time intervals at which the play image 50-1 is updated coincide with those at which the captured image 52 is generated. Therefore, the latest play image 50-1 includes the latest captured image 52 with the most recent date of creation.

Figure 6:
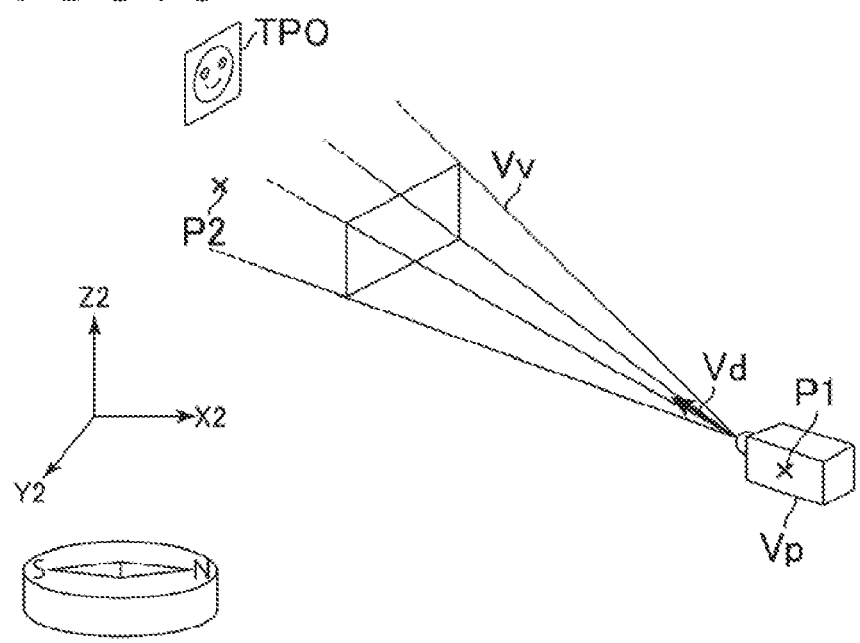
FIG. 6 is a diagram illustrating an example of a virtual space.

The play image 50-1 further includes an image showing what one sees when looking in a direction of line of sight Vd from a viewpoint Vp arranged in a three-dimensional virtual space (refer to FIG. 6). The viewpoint Vp is associated with the first player. FIG. 6 is a diagram illustrating an example of a virtual space associated with the first player. Orientations parallel to the X2-Y2 plane in the virtual space according to the present embodiment are associated with directions in a real space. In the virtual space shown in FIG. 6, the positive X2-axis direction corresponds to North in the real space, and the negative X2-axis direction corresponds to South in the real space. Further, in the virtual space shown in FIG. 6, the positive Y2-axis direction corresponds to East in the real space, and the negative Y2-axis direction corresponds to West in the real space. Still further, in the virtual space shown in FIG. 6, the positive Z2-axis direction corresponds to the vertically upward direction in the real space, and the negative Z2-axis direction corresponds to the vertically downward direction in the real space.

In the present embodiment, a position on the X2-Y2 plane is set to correspond to each of the players participating in the shooting game in the virtual space. FIG. 6 shows positions P1 and P2. The position P1 corresponds to the first player, and the position P2 corresponds to the second player. In the present embodiment, positions in virtual spaces corresponding to players are associated with the positions of the information processors 12 used by the players in a real space. In the present embodiment, for example, the direction of orientation as seen from the position of the first information processor 12-1 toward the position of the second information processor 12-2 is identified when the positions of the first and second information processors 12-1 and 12-2 are connected at the shortest possible distance in a real space. Then, the positions P1 and P2 are set so that the direction roughly coincides with the direction associated with the orientation from the position P1 toward the position P2 in a virtual space. In the present embodiment, the position of the information processor 12 in the real space is identified on the basis of positioning results of the positioning section 36 of the information processor 12.

Then, in a virtual space associated with a player, the viewpoint Vp is arranged at the position corresponding to the player. A target player object TPO is arranged at a position corresponding to other player. FIG. 6 shows a virtual space associated with the first player. Therefore, the viewpoint Vp is arranged at the position P1 corresponding to the first player, and the target player object TPO corresponding to the second player is arranged at the position P2 corresponding to the second player.

The target player object TPO is a polygon model in the shape of a flat plate to which a player's icon image is attached. The target player object TPO is arranged so that the front face thereof is oriented toward the viewpoint Vp. Further, in the present embodiment, the target player object TPO of the second player is arranged at a given distance along the positive Z2-axis direction from the position P2 corresponding to the second player.

In the present embodiment, the direction of line of sight Vd is determined on the basis of the posture of the information processor 12 in the real space. The posture is identified on the basis of detection results of the sensor section 38 of the information processor 12. For example, the direction of line of sight Vd shown in FIG. 6 is determined on the basis of the posture of the first information processor 12-1. In the present embodiment, the sensor section 38 detects the posture of the first information processor 12-1 at given time intervals (e.g., every 1/60 of a second). Then, each time the posture of the first information processor 12-1 is detected, the direction of line of sight Vd is updated to match the detected posture.

Figure 7:
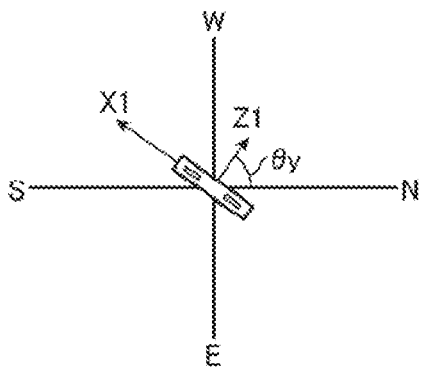
FIG. 7 is a diagram illustrating an example of a relationship between the posture of the information processor according to the embodiment of the present invention and the direction of line of sight of a viewpoint arranged in a virtual space.

FIG. 7 illustrates an example of a relationship between the posture of the information processor 12 according to the present embodiment and the direction of line of sight Vd of the viewpoint Vp arranged in a virtual space. In the present embodiment, the direction of line of sight Vd is represented by a combination of angles formed between a reference orientation and the direction of line of sight Vd as seen from each of the three orientations orthogonal to each other. In the present embodiment, the direction of line of sight Vd is represented, for example, by a combination of a yaw angle $\theta y$, a pitch angle $\theta p$, and a roll angle $\theta r$. For example, the yaw angle $\theta y$ relative to the direction of line of sight Vd is equivalent to the angle formed between the positive X2-axis direction and the direction of line of sight Vd as seen along the negative Z2-axis direction. Here, the counterclockwise direction with reference to the positive X2-axis direction as seen along the negative Z2-axis direction is assumed to be the positive direction. Further, the pitch angle $\theta p$ relative to the direction of line of sight Vd is equivalent to the angle formed between the positive X2-axis direction and the direction of line of sight Vd as seen along the negative Y2-axis direction. Here, the counterclockwise direction with reference to the positive X2-axis direction as seen along the negative Y2-axis direction is assumed to be the positive direction. Still further, the roll angle $\theta r$ relative to the direction of line of sight Vd is equivalent to the angle formed between the positive Z2-axis direction and the direction of line of sight Vd as seen along the positive X2-axis direction. Here, the counterclockwise direction with reference to the positive Z2-axis direction as seen along the positive X2-axis direction is assumed to be the positive direction.

Then, in the present embodiment, a combination of the yaw angle θy, the pitch angle θp, and the roll angle θr is uniquely determined on the basis of the posture of the information processor 12. In the present embodiment, for example, the angles formed between each of the reference orientations and the positive Z1-axis direction of the information processor 12, i.e., the imaging direction of the rear imaging section 34b as seen from each of the three orientations orthogonal to each other, are set as the yaw angle θy, the pitch angle θp, and the roll angle θr, respectively. More specifically, for example, the angle formed between the horizontal direction pointing North and the positive Z1-axis direction of the information processor 12 as seen vertically downward is set as the yaw angle θy relative to the direction of line of sight Vd. Here, the counterclockwise direction with reference to the horizontal direction pointing North as seen vertically downward is assumed to be the positive direction. Then, for example, the angle formed between the horizontal direction pointing North and the positive Z1-axis direction of the information processor 12 as seen from East to West is set as the pitch angle θp relative to the direction of line of sight Vd. Here, the counterclockwise direction with reference to the horizontal direction pointing North as seen from East to West is assumed to be the positive direction. Then, for example, the angle formed between the vertically upward direction and the positive Z1-axis direction of the information processor 12 as seen from South to North is set as the roll angle θr relative to the direction of line of sight Vd. Here, the counterclockwise direction with reference to the vertically upward direction as seen from South to North is assumed to be the positive direction. As described above, in the present embodiment, the imaging direction of the rear imaging section 34b roughly coincides with the direction associated with the direction of line of sight Vd in the virtual space. For example, if the positive Z1-axis direction is the horizontal direction pointing North, the direction of line of sight Vd in the virtual space is the positive X2-axis direction.

Then, in the present embodiment, a field-of-view area Vv in the shape of a bottomless quadrangular pyramid is determined on the basis of the position of the viewpoint Vp and the direction of line of sight Vd. Then, if the target player object TPO is present in the field-of-view area Vv, the play image 50-1 includes a picture of the target player object TPO as illustrated in FIG. 4. In this case, information indicating the name of the player corresponding to the target player object TPO and the distance to the information processor 12 used by the player corresponding to the target player object TPO is also displayed. In the present embodiment, the time intervals at which the play image 50-1 is updated coincide with those at which the direction of line of sight Vd is generated. Then, the latest play image 50-1 includes an image showing what one sees when looking at the virtual space from the direction of line of sight Vd.

Further, in the present embodiment, the direction of orientation from the position of the first information processor 12-1 toward the position of the second information processor 12-2 in the real space roughly coincides with the direction associated with the orientation from the position P1 toward the position P2 in the virtual space as described above. Then, the imaging direction of the rear imaging section 34b roughly coincides with that associated with the direction of line of sight Vd in the virtual space as described above. In the play image 50-1 which includes the captured image 52, captured by the rear imaging section 34b, in the orientation from the position of the first information processor 12-1 toward the position of the second information processor 12-2, therefore, a picture of the target player object TPO of the second player is included.

Further, the play image 50-1 includes missile images MP, a scope image SP, and a launch pad image LP as illustrated in FIG. 4. Each of the missile images MP includes a number that represents its attack power. Here, the first player can select a missile to be fired by operating the operation key 32 and the touch sensor 30. The play image 50-1 in FIG. 4 shows that the missile with attack power of 3 is selected. Further, the position of the image SP in the play image 50-1 remains unchanged despite the change in the posture of the information processor 12. The circular area inside the scope image SP will be hereinafter referred to as a lock-on area.

Figure 8:
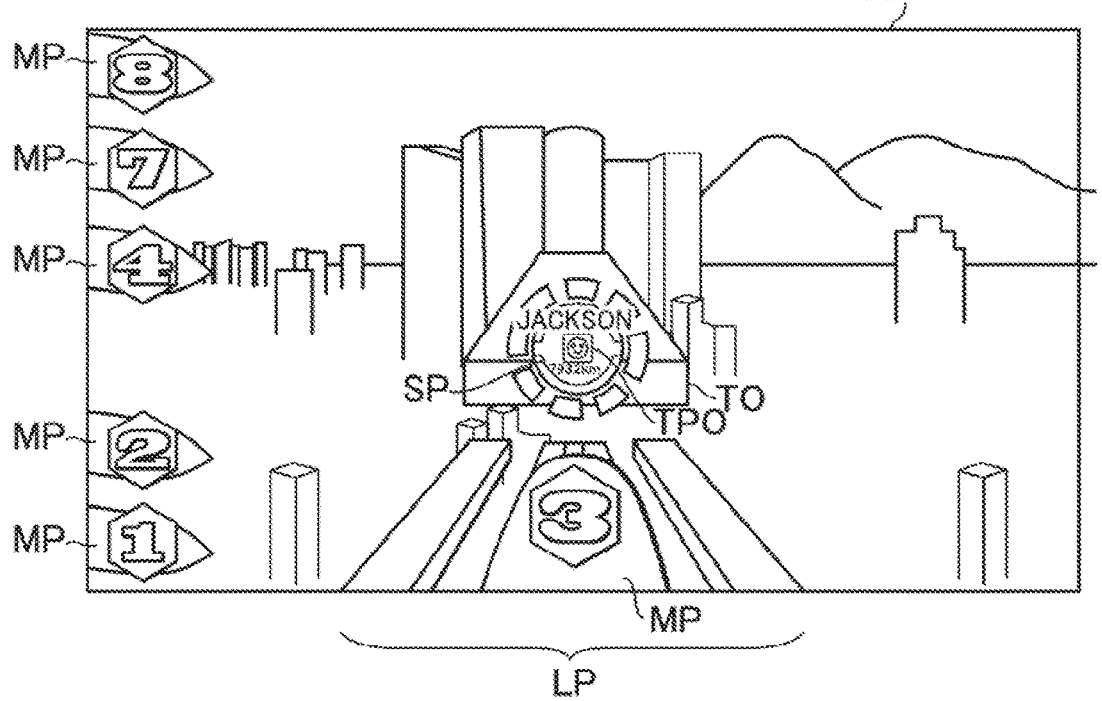
FIG. 8 is a diagram illustrating an example of a play image.

In the present embodiment, if the first player performs a given lock-on operation when at least part of the picture of the target player object TPO corresponding to the second player appears in the lock-on area, the target player object TPO is locked onto. In the present embodiment, for example, if the L button 32d is pressed and held for a given period of time or more, the target player object TPO is locked onto. FIG. 8 illustrates an example of the play image 50-1 that appears when the target player object TPO corresponding to the second player is locked onto. Further, FIG. 9 illustrates an example of a virtual space associated with the first player when the target player object TPO corresponding to the second player is locked onto. When the target player object TPO is locked onto as illustrated in FIG. 9, a translucent orbit object TO representing the orbit of a missile to be fired is arranged in the virtual space. In the present embodiment, the position P1 is set as a start point of the orbit, and the position P2 is set as an end point of the orbit.

In the present embodiment, while the L button 32d is pressed and held, the target player object TPO remains locked onto. Then, when the first player changes the posture of the first information processor 12-1 with the target player object TPO locked onto, the missile's orbit represented by the orbit object TO changes with the positions of the start and end points left unchanged. FIG. 10 is a diagram illustrating an example of the play image 50-1 after the missile's orbit changes. In the present embodiment, a missile is fired in the direction of line of sight Vd identified on the basis of the posture of the information processor 12. Further, in the present embodiment, the missile's orbit is determined uniquely on the basis of the combination of the yaw angle θy and the pitch angle θp identified on the basis of the posture of the information processor 12.

Then, when the first player performs a missile firing operation (e.g., pressing the R button 32e in the present embodiment), the first information processor 12-1 transmits missile data associated with the missile to the second information processor 12-2 (refer to FIG. 11). FIG. 11 illustrates an example of a missile data structure. The missile data is transmitted to the second information processor 12-2 via the server 14. As illustrated in FIG. 11, the missile data includes a firing player ID, a target player ID, attack power data, and orbit data. The firing player ID is identification information of the player who performed a missile firing operation. Here, identification information of the first player is set as a firing player ID. The target player ID is identification information of the player associated with the target player object TPO, the target to be reached by the missile.

Here, identification information of the second player is set as a target player ID. Attack power data is data representing the missile's attack power. For example, if a missile with an attack power of 3 is fired, 3 is set as an attack power data value. The orbit data is determined on the basis of the posture of the information processor 12 at the time of the firing operation and associated with the orbit of the missile. In the present embodiment, the combination of the yaw angle θy and the pitch angle θp relative to the direction of line of sight Vd identified on the basis of the posture of the information processor 12 at the time of the firing operation is set as orbit data values included in the missile data.

Figure 12:
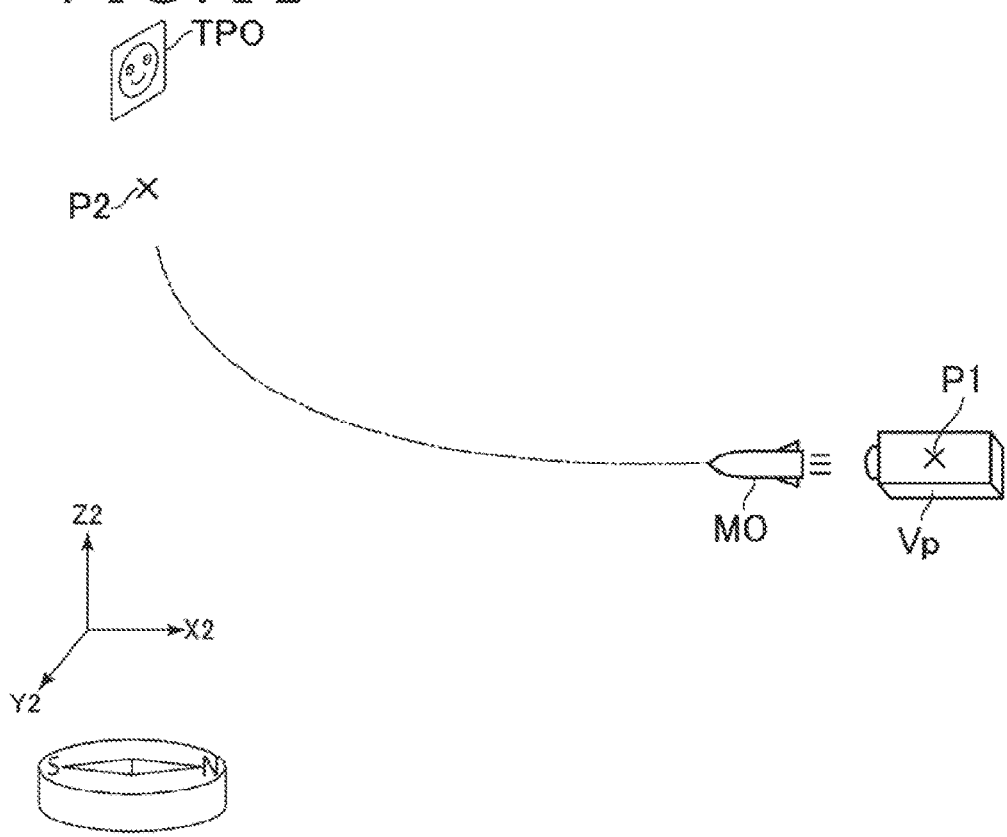
FIG. 12 is a diagram illustrating an example of a virtual space.
Figure 13:
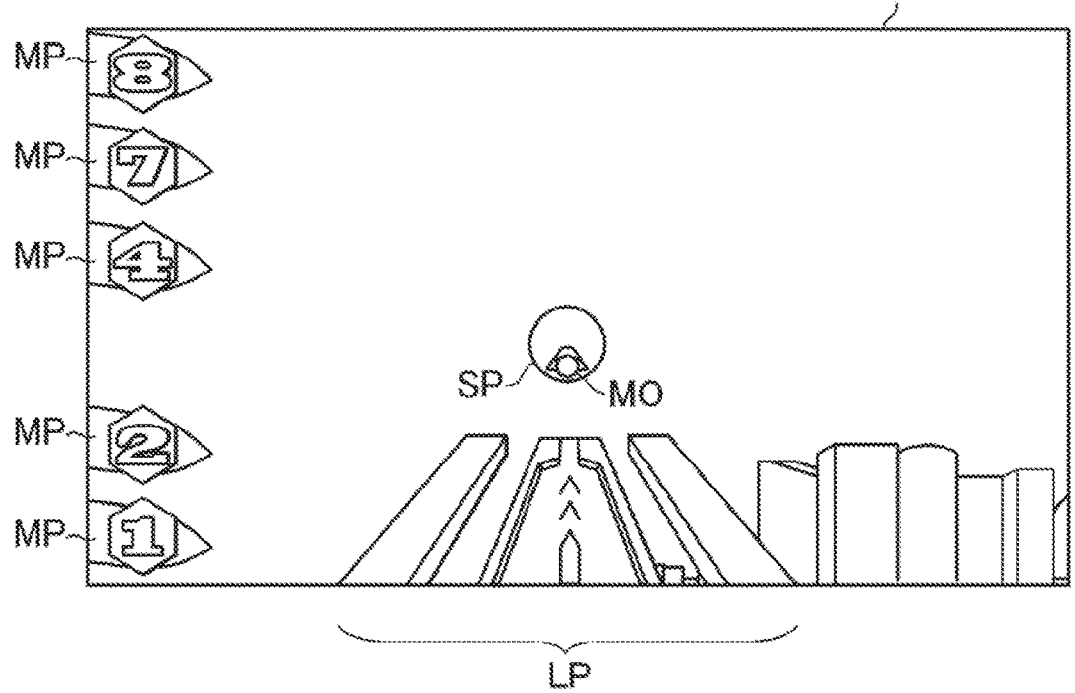
FIG. 13 is a diagram illustrating an example of a play image.

Then, the display section 28 of the first information processor 12-1 shows a scene of a missile being fired from a launch pad. Then, a missile object MO associated with the missile is arranged at the position of the virtual space along the orbit determined on the basis of the combination of the yaw angle θy and the pitch angle θp set as the orbit data values described above. FIG. 12 is a diagram illustrating an example of a virtual space associated with the first player in which the missile object MO is arranged. In the present embodiment, the missile object MO is arranged at a position which is along the orbit determined at the time of the firing operation and which is at a given distance from the start point of the orbit. FIG. 13 is a diagram illustrating an example of the play image 50-1 that appears on the display section 28 of the information processor 12-1 after a missile is fired. The play image 50-1 in FIG. 13 shows a picture of the missile object MO. In the present embodiment, the missile object MO arranged in a virtual space moves toward the position P2 along a determined orbit at a given speed in the virtual space.

As described above, the destination information processor 12 to which to transmit missile data is determined on the basis of the posture of the information processor 12 at the time of a lock-on operation in the present embodiment. Then, orbit data values included in missile data are determined on the basis of the posture of the information processor 12 at the time of a firing operation which will be performed afterwards. Then, the missile data is transmitted to the determined destination information processor 12. As described above, the present embodiment allows for determination of the destination information processor 12 to which to transmit orbit data values included in missile data to be transmitted and the missile data itself on the basis of detection results of the sensor section 38.

When the second information processor 12-2 receives the missile data described above, the orbit of the missile object MO associated with the missile data is determined on the basis of the received missile data. Then, the missile object MO is arranged in a three-dimensional virtual space shown in FIG. 14. The three-dimensional virtual space is associated with the second player. The missile object MO heads for the viewpoint Vp arranged in the three-dimensional virtual space. The missile object MO will be hereinafter referred to as a target missile object TMO.

Figure 14:
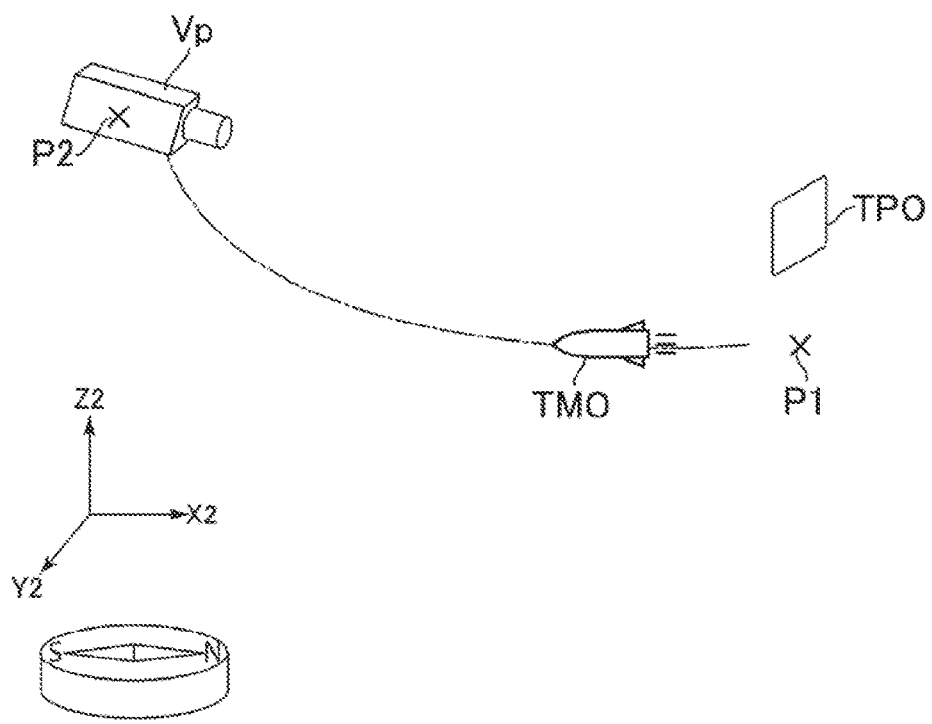
FIG. 14 is a diagram illustrating an example of a virtual space.

In the present embodiment, the direction of orientation as seen from the position of the second information processor 12-2 toward the position of the first information processor 12-1 is identified when the positions of the second and first information processors 12-2 and 12-1 are connected at the shortest possible distance in a real space. Then, the positions P2 and P1 are set so that the direction roughly coincides with the direction associated with the orientation from the position P2 toward the position P1 in the virtual space shown in FIG. 14. It should be noted that the coordinates of the positions P1 and P2 set in the virtual space associated with the second player in FIG. 14 are the same as those of the positions P1 and P2 set in the virtual space associated with the first player in FIG. 6, respectively. FIG. 14 illustrates a virtual space associated with the second player. Therefore, the viewpoint Vp is arranged at the position P2 corresponding to the second player, and the target player object TPO is arranged at the position P1 corresponding to the first player. Then, the position corresponding to the firing player ID included in the received missile data (position P1 here) is set as the position of the start point of the target missile object TMO. Further, the position associated with the target player ID included in the missile data (position P2 here) is set as the position of the end point of the target missile object TMO. Then, the orbit of the target missile object TMO is determined on the basis of the orbit data values (combination of the values of the yaw angle θy and the pitch angle θp) included in the received missile data. The target missile object TMO is arranged at a position along the determined orbit and at a given distance from the start point of the orbit. Then, the target missile object TMO moves along the determined orbit toward the position P2 at a given speed in the virtual space.

In the present embodiment, the direction in which the missile object MO is fired as seen from the position P1 to the position P2 is horizontally flipped from the direction in which the missile object MO is coming as seen from the position P2 to the position P1. For example, if fired toward the top left side from the position P1, the missile object MO will be coming from the top right side as seen from the position P2 of the viewpoint Vp arranged in the virtual space associated with the second player.

Figure 15:
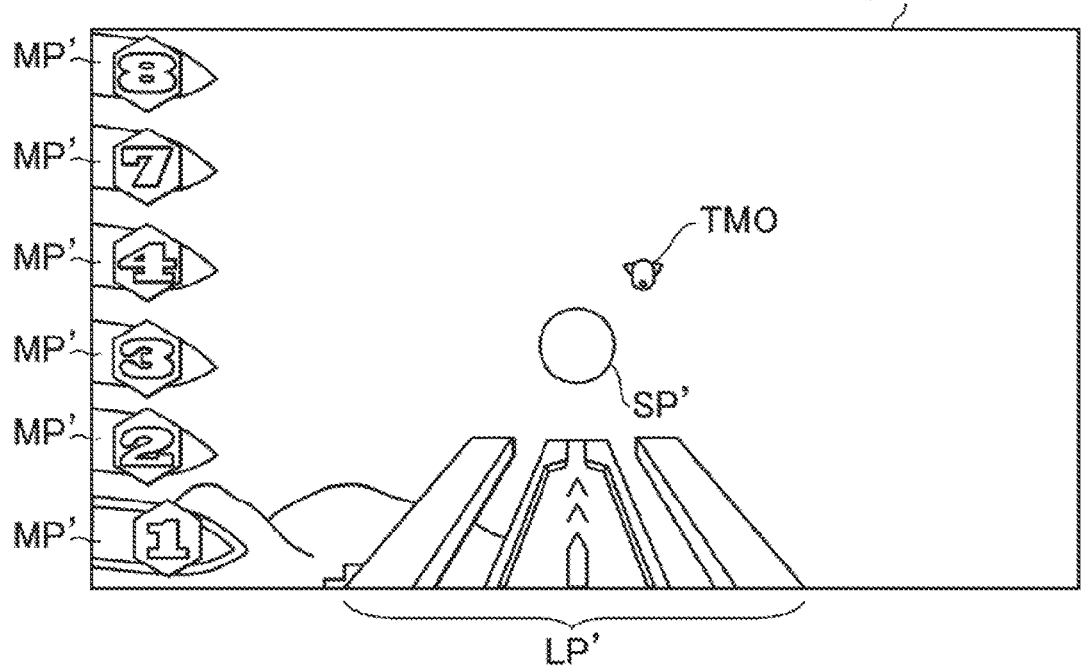
FIG. 15 is a diagram illustrating an example of a play image.

In the present embodiment, the direction of line of sight Vd from the viewpoint Vp arranged in the virtual space shown in FIG. 14 is determined on the basis of the posture of the second information processor 12-2 in the virtual space as described above. Then, the field-of-view area Vv is determined on the basis of the position of the viewpoint Vp and the direction of line of sight Vd. Then, if the target missile object TMO is present in the field-of-view area Vv, a play image 50-2 appearing in the display section 28 of the second information processor 12-2 includes a picture of the target missile object TMO. FIG. 15 is a diagram illustrating an example of the play image 50-2 that appears on the display section 28 of the second information processor 12-2 after the target missile object TMO is arranged in the virtual space. The play image 50-2 shown in FIG. 15 includes a picture of the target missile object TMO. In this case, information indicating the attack power of the target missile object TMO is also displayed. Further, the play image 50-2 shown in FIG. 15 also includes missile images MP', a scope image SP', and a launch pad image LP'.

Figure 16:
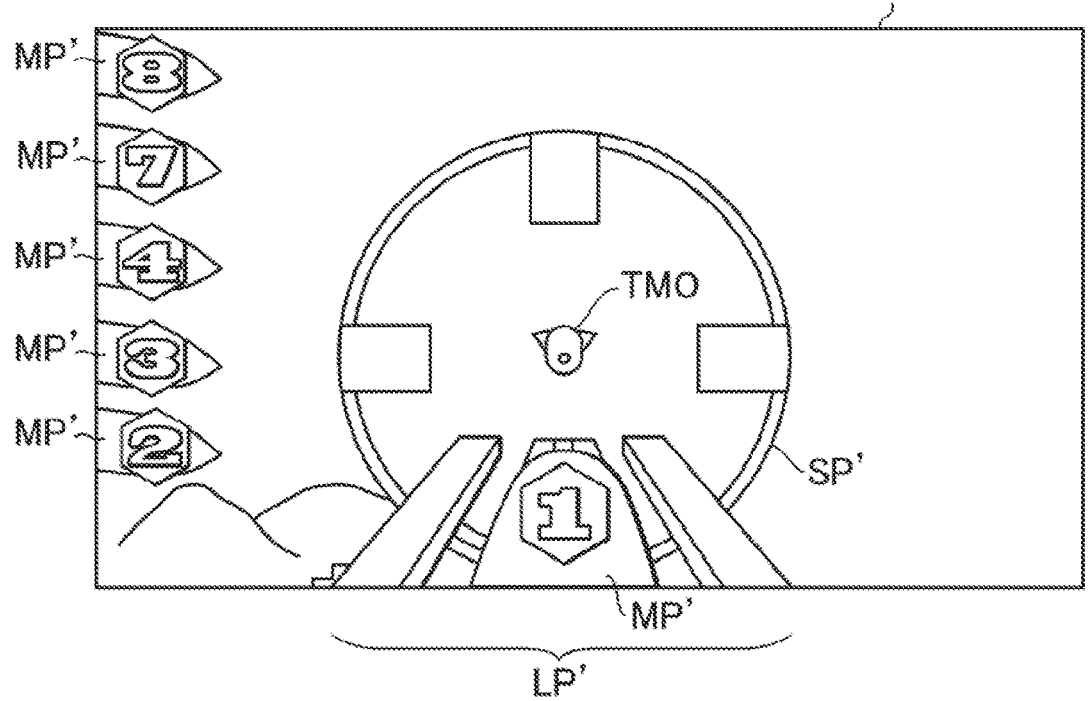
FIG. 16 is a diagram illustrating an example of a play image.

Here, if the second player performs a given lock-on operation when at least part of the picture of the target missile object TMO appears in the lock-on area, the target missile object TMO is locked onto. FIG. 16 is a diagram illustrating an example of the play image 50-2 that appears when the target missile object TMO is locked onto. In the present embodiment, in order to lock onto the target missile object TMO, the second player needs to adjust the posture of the second information processor 12-2 properly so that the direction of line of sight Vd is oriented toward the target missile object TMO.

Figure 17:
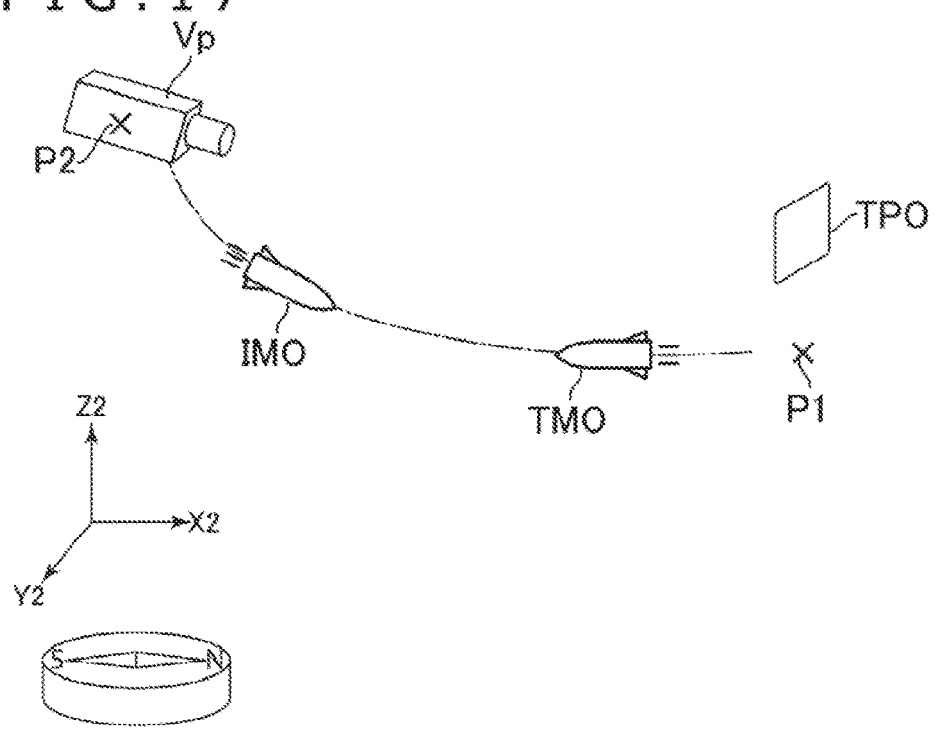
FIG. 17 is a diagram illustrating an example of a virtual space.

Then, when the second player performs a missile firing operation, the display section 28 of the second information processor 12-2 shows a scene of a missile being fired from a launch pad. Then, the missile object MO corresponding to the fired missile is arranged in the virtual space. The missile object MO will be hereinafter referred to as an interceptor missile object IMO. FIG. 17 is a diagram illustrating an example of a virtual space associated with the second player in which the target missile object TMO and the interceptor missile object IMO are arranged. The interceptor missile object IMO is arranged at a position along the orbit of the target missile object TMO and at a given distance from the end point of the orbit. Further, the interceptor missile object IMO is arranged to be oriented in the opposite direction to the target missile object TMO. Then, in the present embodiment, the interceptor missile object IMO moves along the orbit of the target missile object TMO in the direction opposite to the direction of travel of the target missile object TMO at a given speed in the virtual space.

Here, we assume that the target missile object TMO and the interceptor missile object IMO come into collision. In this case, if the interceptor missile object IMO is higher in attack power than the target missile object TMO, the two missile objects MO will be both deleted from the virtual space. That is, in this case, the second player has successfully intercepted the missile object MO fired from the first player. If the interceptor missile object IMO is lower in attack power than the target missile object TMO, the interceptor missile object IMO will be deleted from the virtual space. Then, the attack power of the target missile object TMO diminishes by the attack power of the interceptor missile object IMO. If the target missile object TMO and the interceptor missile object IMO are identical in attack power, the target missile object TMO will be deleted from the virtual space. Then, the attack power of the interceptor missile object IMO becomes equal to the attack power of the target missile object TMO plus 1.

In the present embodiment, when the missile object MO reaches the target player object TPO, the score of the player corresponding to the target player object TPO will be reduced by 10 times the value representing the attack power of the missile object MO. Then, the player with the highest score in a given period of time after the start of the game is the winner.

In the present embodiment, it is possible for a player to experience a sensation as if a game played in a virtual space is taking place in a real space by using the imaging section 34, the positioning section 36, and the sensor section 38 of the information processor 12 as described above.

It should be noted that although, in the above description, only the positions P1 and P2 are set in a virtual space, the position corresponding to other player participating in the shooting game is similarly set. Here, the information processor 12 used by the other player will be referred to as the other information processor 12, and the position corresponding to the other player will be referred to as a position Px. A description will be given below of a case in which the position Px is set in the virtual space shown in FIG. 6. In this case, the direction of orientation as seen from the position of the first information processor 12-1 toward the position of the other information processor 12 is identified first when the positions of the first and other information processors 12-1 and are connected at the shortest possible distance in a real space. Then, the position Px is set in the virtual space shown in FIG. 6 so that the direction roughly coincides with the direction associated with the orientation from the position P1 toward the position Px in the virtual space shown in FIG. 6. A description will be given next of a case in which the position Px is set in the virtual space shown in FIG. 14. In this case, the direction of orientation as seen from the position of the second information processor 12-2 toward the position of the other information processor 12 is identified when the positions of the second and other information processors 12-2 and 12 are connected at the shortest possible distance in a real space. Then, the position Px is set in the virtual space shown in FIG. 14 so that the direction roughly coincides with the direction associated with the orientation from the position P2 toward the position Px in the virtual space shown in FIG. 14.

As described above, the destination information processor 12 to which to transmit orbit data values included in missile data to be transmitted and the missile data itself is determined on the basis of the posture of the information processor 12 in the present embodiment. A description will be given below with focus on generation of missile data and transmission and reception handled by the information processor 12 according to the present embodiment.

Figure 18:
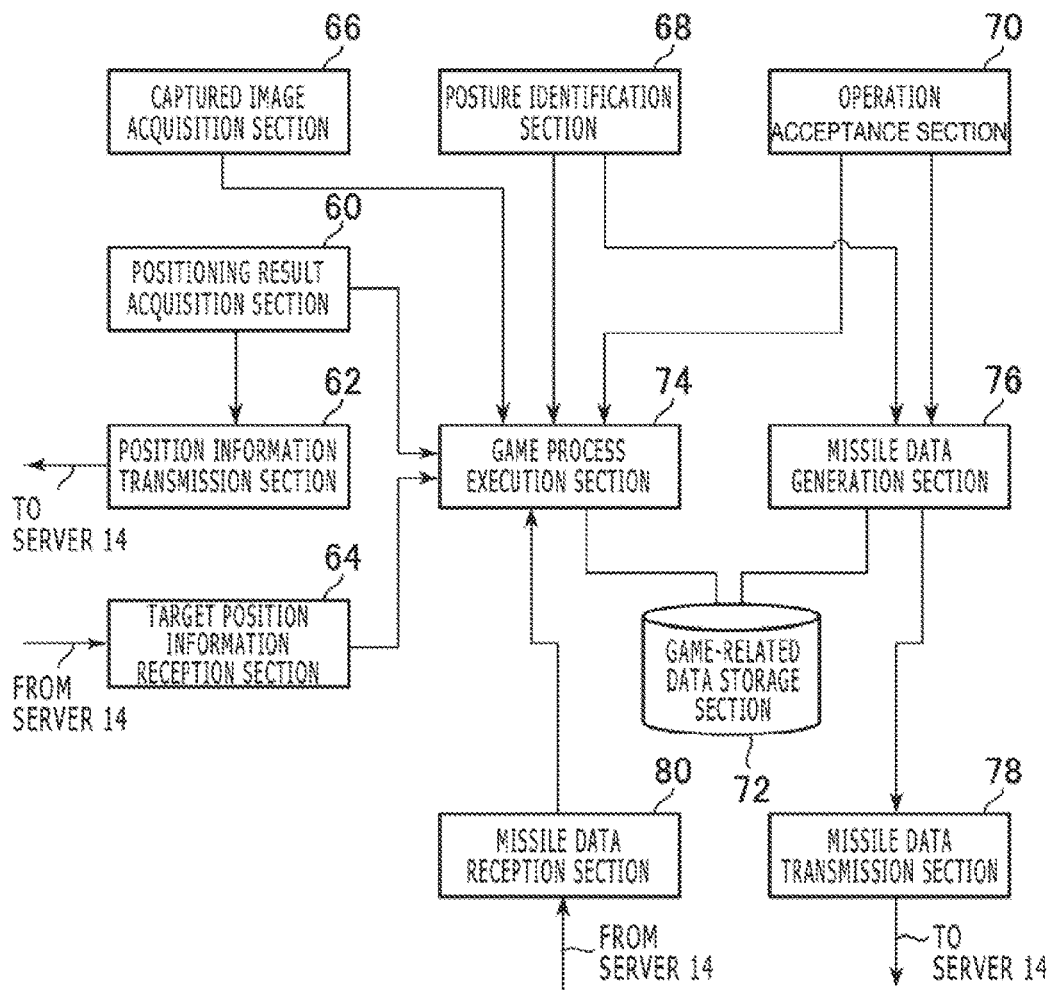
FIG. 18 is a functional block diagram illustrating examples of functions implemented by the information processor according to the embodiment of the present invention.

FIG. 18 is a functional block diagram illustrating examples of functions implemented by the information processor 12 according to the present embodiment. It should be noted that there is no need to implement all the functions shown in FIG. 18 in the information processor 12 according to the present embodiment, and that functions other than those shown in FIG. 18 may also be implemented.

The information processor 12 according to the present embodiment functionally includes, for example, a positioning result acquisition section 60, a position information transmission section 62, a target position information reception section 64, a captured image acquisition section 66, a posture identification section 68, an operation acceptance section 70, a game-related data storage section 72, a game process execution section 74, a missile data generation section 76, a missile data transmission section 78, and a missile data reception section 80 as illustrated in FIG. 18. The game-related data storage section 72 is primarily implemented as the storage section 22 of the information processor 12. The position information transmission section 62, the target position information reception section 64, the missile data transmission section 78, and the missile data reception section 80 are primarily implemented as the communication section 24 of the information processor 12. Other functions are primarily implemented as the control section 20 of the information processor 12.

Then, the above functions are implemented as a result of execution of a program installed in the information processor 12, a computer, and including instructions corresponding to the above functions by the control section 20 of the information processor 12. The program may be supplied to the information processor 12 via a computer-readable information storage medium such as optical disc, magnetic disk, magnetic tape, magneto-optical disc, or flash memory. Alternatively, the program may be supplied to the information processor 12 via a computer network such as the Internet.

The positioning result acquisition section 60 acquires positioning results of the positioning section 36. The positioning result acquisition section 60 acquires, for example, position coordinate data generated by the positioning section 36. In the present embodiment, when the execution of the shooting game program begins, the positioning section 36 receives a satellite signal (GPS signal), generating position coordinate data indicating position coordinates (latitude and longitude in the present embodiment) on the basis of the satellite signal. Then, the positioning result acquisition section 60 acquires the position coordinate data.

The position information transmission section 62 transmits the position information acquired by the positioning result acquisition section 60 to the server 14. In the present embodiment, the position information transmission section 62 transmits, to the server 14, position coordinate data that is linked to identification information of the player using the information processor 12 and that indicates the position coordinates of the information processor 12. The server 14 receives and stores the position coordinate data linked to the identification information of all the players participating in the shooting game.

The target position information reception section 64 receives, from the server 14, position coordinate data linked to identification information of the information processor 12 used by other player participating in the shooting game. In the present embodiment, when the execution of the shooting game program begins, the target position information reception section 64 transmits a request for transmission of position coordinate data of other player participating in the shooting game to the server 14. In response to the request for transmission, the server 14 transmits position coordinate data to the information processor 12. Then, the target position information reception section 64 receives the position coordinate data.

The captured image acquisition section 66 acquires the captured image 52 captured by the imaging section 34. The captured image acquisition section 66 acquires the captured image 52 at given time intervals (e.g., every 1/60 of a second) in the present embodiment.

The posture identification section 68 identifies the posture of the information processor 12 detected by the sensor section 38. In the present embodiment, the posture identification section 68 identifies, on the basis of the identified posture, the yaw angle θy, the pitch angle θp, and the roll angle θr. In the present embodiment, the posture identification section 68 identifies the yaw angle θy, the pitch angle θp, and the roll angle θr at given time intervals (e.g., every 1/60 of a second).

The operation acceptance section 70 accepts an operation signal from the operation key 32 and identifies the operation key 32 that is being entered. In the present embodiment, the operation acceptance section 70 identifies the operation key 32 that is being entered at given time intervals (e.g., every 1/60 of a second).

The game-related data storage section 72 stores a variety of data related to the shooting game. The game-related data storage section 72 stores, for example, data representing a virtual space associated with the player using the information processor 12, data of virtual objects arranged in the virtual space, images included in the play image 50, the attack power level of the currently selected missile, and so on.

The game process execution section 74 performs a variety of processes related to the play of the shooting game as described above. The processes will be hereinafter referred to as game processes. The game process execution section 74 performs processes such as building a virtual space and arranging the viewpoint Vp and virtual objects in the virtual space. In the present embodiment, the viewpoint Vp is arranged at the position corresponding to the position coordinates represented by the position coordinates acquired by the positioning result acquisition section 60. Further, in the present embodiment, the target player object TPO of the player is arranged at the position corresponding to the position coordinates represented by the position coordinate data received by the target position information reception section 64 and linked to the identification information of other player. Further, the game process execution section 74 identifies the target player object TPO associated with the destination information processor 12 to which to transmit missile data on the basis of the posture of the information processor 12 at the time of a lock-on operation. Further, the game process execution section 74 performs other processes such as moving the missile objects MO in or deleting it from the virtual space, reducing the score, generating the play image 50, and displaying the play image 50 on the display section 28.

The missile data generation section 76 generates missile data when the operation acceptance section 70 accepts a missile firing operation with the target player object TPO locked onto. In the present embodiment, the missile data generation section determines the information processor 12 used by the player which has been locked onto as a destination device to which to transmit missile data. Further, the missile data generation section 76 determines orbit data values included in the missile data on the basis of the posture identified by the posture identification section 68 when the R button 32e is pressed. That is, in the present embodiment, orbit data values are determined on the basis of the posture identified at a time later than when the target player object TPO is locked onto.

The missile data transmission section 78 transmits missile data generated by the missile data generation section 76 to the server 14. When the server 14 receives the missile data, it identifies the target player ID included in the missile data. Then, the server 14 transmits the missile data to the information processor 12 of the player corresponding to the target player ID.

The missile data reception section 80 receives the missile data transmitted from the server 14.

Figure 19:
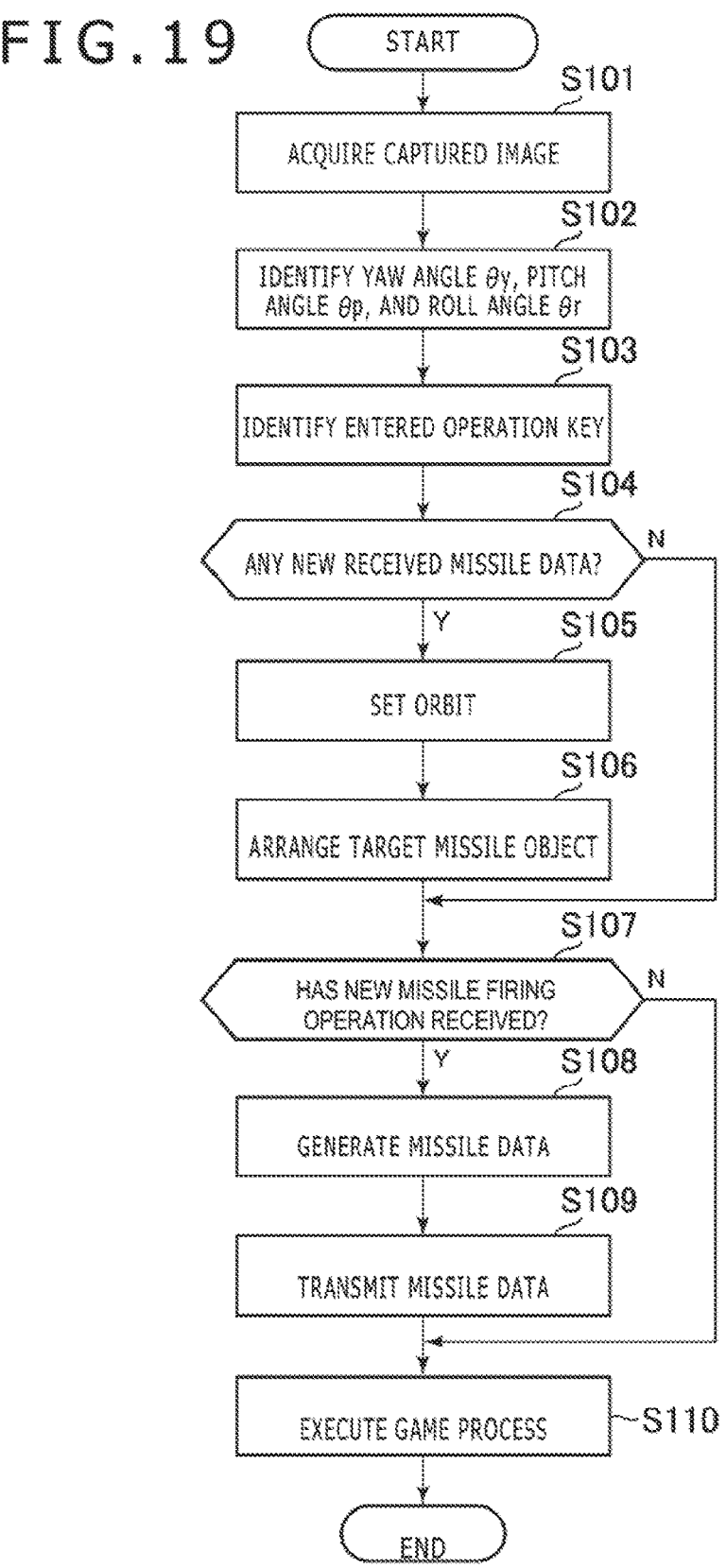
FIG. 19 is a flowchart illustrating an example of a flow of processes handled by the information processor according to the present embodiment.

A description will be given here of a flow of processes handled by the information processor 12 according to the present embodiment at given time intervals (e.g., every 1/60 of a second) with reference to the flowchart shown in FIG. 19.

First, the captured image acquisition section 66 acquires the captured image 52 acquired by the imaging section (S101). Then, the posture identification section 68 acquires detection results of the sensor section 38, identifying the yaw angle θy, the pitch angle θp, and the roll angle θr on the basis of the detection results (S102). Then, the operation acceptance section 70 identifies the operation key 32 that is being entered (S103).

Then, the game process execution section 74 verifies whether or not there is any new missile data received by the missile data reception section 80 (S104). When there is new missile data (Y in S104), the game process execution section 74 sets an orbit in the virtual space on the basis of the missile data (S105). Then, the game process execution section 74 arranges the target missile object TMO at a position along the orbit (S106).

Then, the missile data generation section 76 verifies whether or not the operation acceptance section 70 has accepted a new missile firing operation with the target player object TPO locked onto (S107). If it is verified that there is no missile data received by the missile data reception section 80 in the process shown in S104 (N in S104), the process shown in step S107 is performed. Then, when it is verified that a new missile firing operation has been accepted (Y in S107), the missile data generation section 76 generates missile data (S108). Here, identification information of the player using the information processor 12 is set as firing player ID values included in the missile data. Then, identification information of the player corresponding to the target player object TPO that is locked onto is set as target player ID values included in the missile data. Then, the attack power level of the currently selected missile stored in the game-related data storage section 72 is set as an attack power data level included in the missile data. Then, the combination of the values of the yaw angle θy and the pitch angle θp identified by the posture identification section in the process shown in S102 is set as orbit data values included in the missile data. Then, the missile data transmission section 78 transmits missile data generated in the process shown in S108 to the server 14 (S109).

Then, the game process execution section 74 performs a game process identified on the basis of results of the processes shown in S101 to S109 (S110). Even if it is verified that a new missile firing operation has yet to be accepted in the process shown in S107 (N in S107), the process shown in S110 is performed. In the process shown in S110, the game process execution section 74 arranges a virtual object in the virtual space, generates the play image 50, and displays the play image 50 on the display section 28.

Figure 20:
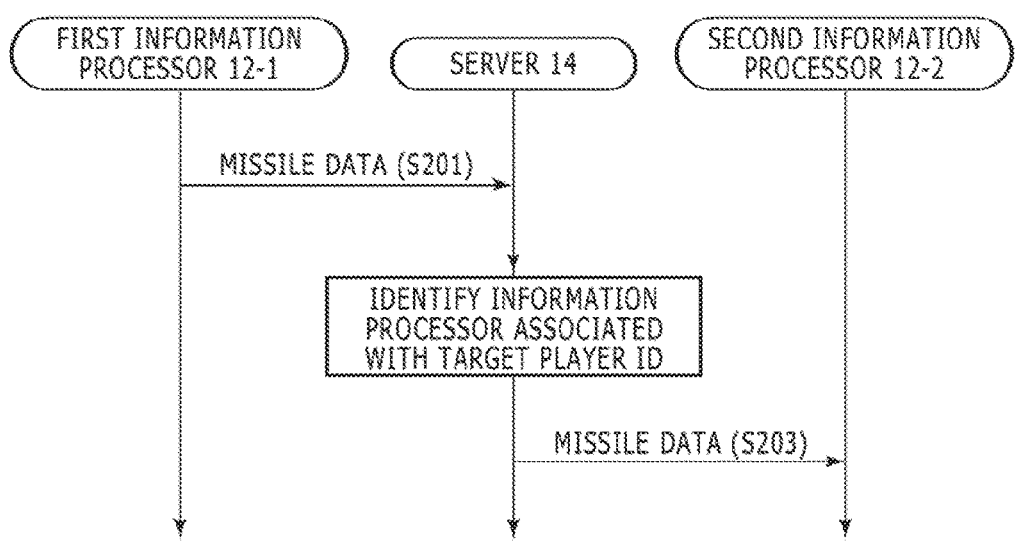
FIG. 20 is a flowchart illustrating an example of a flow of processes handled by the information processing system according to the present embodiment.

A description will be given next of a flow of processes handled by the information processing system 10 according to the present embodiment when missile data is transmitted from the first information processor 12-1 in the process shown in S109 with reference to the flowchart shown in FIG. 20.

First, the server 14 receives missile data from the first information processor 12-1 (S201). Then, the server 14 identifies the information processor 12 used by the player corresponding to the target player ID included in the missile data (S202). We assume here that the second information processor 12-2 has been identified. Then, the server 14 transmits the missile data received in the process shown in S201 to the information processor 12 identified in the process shown in S202 (second information processor 12-2 here). The information processor 12 identified in the process shown in S202 (second information processor 12-2 here) receives the missile data (S203).

The information processor 12 that has received the missile data in the process shown in S203 sets an orbit as shown in S105 and arranges the target missile object TMO as shown in S106.

It should be noted that the present invention is not limited to the above embodiment.

For example, data exchanged between the information processors 12 according to the present embodiment is not limited to missile data. The present embodiment may be applied, for example, to exchange of messages between the information processors 12. For example, the information processor 12 present in the imaging direction of the rear imaging section 34b may be identified as the destination information processor 12 to which to transmit a message on the basis of the posture of the information processor 12 when the L button 32d is pressed. Then, a message appropriate to the posture of the information processor 12 at that time may be transmitted the message to the destination information processor 12 when the R button 32e is pressed afterwards. For example, a message "Long time no see" may be transmitted when the information processor 12 is face up, and a message "Hello" may be transmitted when the information processor 12 is face down.

Further, the sharing of roles between the information processors 12 and the server 14 is not limited to the above. Still further, each of the information processors 12 and the server 14 may include a plurality of housings. Still further, the above specific character strings and those in the drawings are illustrative, and the present invention is not limited to these character strings.

The invention claimed is:

1. An information processor having a sensor detecting a posture thereof, the information processor comprising:

a display section configured to display a virtual space generated by the information processor;

a transmission destination device determination section adapted to identify and designate a hand-held mobile device to receive a data transmission on a basis of the detected posture of the information processor and an established line of sight from the information processor to the hand-held mobile device in real space, wherein said posture controls the line of sight;

a transmission data determination section adapted to determine data content to be transmitted to the hand-held mobile device after the hand-held mobile device is identified; and a transmission section adapted to transmit the data content to the identified hand-held mobile device, wherein the data content includes missile data for a missile displayed in the virtual space, wherein a translucent orbit object is displayed in the virtual space and represents a potential orbit of the missile, wherein the information processor is carried by a first player and the hand-held mobile device is carried by a second player, wherein a position of the hand-held device in real space is acquired by said information processor and translated into a corresponding position in the virtual space, wherein the virtual space comprises a play image that includes an image captured and generated by a rear imaging section of the information processor at a given time interval, wherein the play image includes an image showing what a user of the information processor sees in the real world when looking in a direction of the line of sight from a viewpoint, wherein a field-of-view area is determined on the basis of the position of the viewpoint and the direction of the line of sight, and when the second player is present in the field-of-view area, the play image includes a picture of the second player in the form of a target player object, wherein the information processor is a game controller comprising directional keys, analog sticks, an L button and an R button, and a rear imaging section configured to capture an image for use as a background image, wherein a lock-on object is displayed on the display section of the information processor and the target player is locked onto when at least part of the target player object appears inside the lock-on object, wherein the target player object remains locked onto if the L button is pressed and held, wherein the missile's potential orbit as represented by the orbit object changes when the first player changes the posture of the information processor with the target player object locked onto, and wherein the missile's actual orbit in the virtual space is determined by the posture of the information processor at the time the first player uses the information processor to perform a missile firing operation.

2. The information processor of claim 1, wherein the transmission data determination section determines data content to be transmitted to the transmission destination device on the basis of the posture identified on the basis of detection results of the sensor later than when the transmission destination device is determined.

3. The information processor of claim 1, further comprising:
a positioning section,
wherein the transmission destination device determination section determines, from among a plurality of hand-held mobile devices, the hand-held mobile device based not only on a relationship, identified for each of the plurality of devices, between a position of each of the plurality of devices and a position of the information processor identified on a basis of positioning results of the positioning section but also on the posture identified on the basis of detection results of the sensor.

4. The information processor of claim 3, wherein the transmission destination device determination section determines, from among a plurality of hand-held mobile devices, the device to receive the transmission based not only on a direction of orientation, identified for each of the plurality of devices, from the position of the information processor toward the position of each of the plurality of devices but also on a direction corresponding to the posture identified on the basis of detection results of the sensor.

5. The information processor of claim 1, wherein the transmission destination device determination section identifies and designates the device to receive the transmission on a basis of an imaging direction of the rear imaging section identified on the basis of detection results of the sensor.

6. An information processor having a sensor detecting a posture thereof, the information processor comprising:
a display section configured to display a virtual space generated by the information processor;
a reception section adapted to receive data from a transmitter;
a posture identification section adapted to identify the posture of the information processor on a basis of detection results of the sensor; and
a process execution section adapted to perform a process appropriate to the received data and the identified posture of the information processor, the transmitter having a sensor detecting a posture thereof, the transmitter including:
a transmission destination device determination section adapted to identify and designate a hand-held mobile device to receive a data transmission on a basis of the identified posture of the transmitter and an established line of sight from the information processor to the hand-held mobile device in real space, wherein said posture controls the line of sight;
a transmission data determination section adapted to determine data content to be transmitted to the hand-held mobile device on the basis of the identified posture of the transmitter after the hand-held mobile device is identified; and
a transmission section adapted to transmit the data to the hand-held mobile device, wherein the data content includes missile data for a missile displayed in the virtual space,
wherein a translucent orbit object is displayed in the virtual space and represents a potential orbit of the missile,
wherein the information processor is carried by a first player and the hand-held mobile device is carried by a second player,
wherein a position of the hand-held device in real space is acquired by said information processor and translated into a corresponding position in the virtual space,
wherein the virtual space comprises a play image that includes an image captured and generated by a rear imaging section of the information processor at a given time interval,
wherein the play image includes an image showing what a user of the information processor sees in the real world when looking in a direction of the line of sight from a viewpoint,
wherein a field-of-view area is determined on the basis of the position of the viewpoint and the direction of the line of sight, and when the second player is present in the field-of-view area, the play image includes a picture of the second player in the form of a target player object,
wherein the information processor is a game controller comprising directional keys, analog sticks, an L button and an R button, and a rear imaging section configured to capture an image for use as a background image,
wherein a lock-on object is displayed on the display section of the information processor and the target player is locked onto when at least part of the target player object appears inside the lock-on object,
wherein the target player object remains locked onto if the L button is pressed and held,
wherein the missile's potential orbit as represented by the orbit object changes when the first player changes the posture of the information processor with the target player object locked onto, and
wherein the missile's actual orbit in the virtual space is determined by the posture of the information processor at the time the first player uses the information processor to perform a missile firing operation.

7. A control method of an information processor having a sensor detecting a posture thereof, the control method comprising:
identifying and designating a hand-held mobile device to receive a data transmission on a basis of the detected posture of the information processor and an established line of sight from the information processor to the hand-held mobile device in real space, wherein said posture controls the line of sight;
determining data content to be transmitted to the hand-held mobile device on the basis of the identified posture of the information processor after the hand-held mobile device is identified; and
transmitting the data to the hand-held mobile device, wherein the data content includes missile data for a missile displayed in a virtual space generated by the information processor,
wherein a translucent orbit object is displayed in the virtual space and represents a potential orbit of the missile,
wherein the information processor is carried by a first player and the hand-held mobile device is carried by a second player,
wherein a position of the hand-held device in real space is acquired by said information processor and translated into a corresponding position in the virtual space,
wherein the virtual space comprises a play image that includes an image captured and generated by a rear imaging section of the information processor at a given time interval,
wherein the play image includes an image showing what a user of the information processor sees in the real world when looking in a direction of the line of sight from a viewpoint, wherein a field-of-view area is determined on the basis of the position of the viewpoint and the direction of the line of sight, and when the second player is present in the field-of-view area, the play image includes a picture of the second player in the form of a target player object, wherein the information processor is a game controller comprising directional keys, analog sticks, an L button and an R button, and a rear imaging section configured to capture an image for use as a background image, wherein a lock-on object is displayed on a display section of the information processor and the target player is locked onto when at least part of the target player object appears inside the lock-on object, wherein the target player object remains locked onto if the L button is pressed and held, wherein the missile's potential orbit as represented by the orbit object changes when the first player changes the posture of the information processor with the target player object locked onto, and wherein the missile's actual orbit in the virtual space is determined by the posture of the information processor at the time the first player uses the information processor to perform a missile firing operation.

8. A control method of an information processor having a sensor detecting a posture thereof, the control method comprising:

receiving data from a transmitter;

identifying the posture of the information processor on a basis of detection results of the sensor; and performing a process appropriate to the received data and the identified posture of the information processor, the transmitter having a sensor detecting a posture thereof, the transmitter including:

a transmission destination device determination section adapted to determine a hand-held mobile device to receive a data transmission on a basis of the identified posture of the transmitter and an established line of sight from the information processor to the hand-held mobile device in real space, wherein said posture controls the line of sight;

a transmission data determination section adapted to determine data content to be transmitted to the hand-held mobile device on the basis of the identified posture of the transmitter after the hand-held mobile device is identified; and a transmission section adapted to transmit the data to the hand-held mobile device, wherein the data content includes missile data for a missile displayed in a virtual space generated by the information processor, wherein a translucent orbit object is displayed in the virtual space and represents a potential orbit of the missile, wherein the information processor is carried by a first player and the hand-held mobile device is carried by a second player, wherein a position of the hand-held device in real space is acquired by said information processor and translated into a corresponding position in the virtual space, wherein the virtual space comprises a play image that includes an image captured and generated by a rear imaging section of the information processor at a given time interval, wherein the play image includes an image showing what a user of the information processor sees in the real world when looking in a direction of the line of sight from a viewpoint, wherein a field-of-view area is determined on the basis of the position of the viewpoint and the direction of the line of sight, and when the second player is present in the field-of-view area, the play image includes a picture of the second player in the form of a target player object, wherein the information processor is a game controller comprising directional keys, analog sticks, an L button and an R button, and a rear imaging section configured to capture an image for use as a background image, wherein a lock-on object is displayed on a display section of the information processor and the target player is locked onto when at least part of the target player object appears inside the lock-on object, wherein the target player object remains locked onto if the L button is pressed and held, wherein the missile's potential orbit as represented by the orbit object changes when the first player changes the posture of the information processor with the target player object locked onto, and wherein the missile's actual orbit in the virtual space is determined by the posture of the information processor at the time the first player uses the information processor to perform a missile firing operation.

9. A non-transitory, computer readable recording medium containing a computer program, which when executed by a computer having a sensor detecting a posture thereof, the computer to carry out actions, comprising:

receiving data from a transmitter;

identifying the posture of the computer on a basis of detection results of the sensor;

performing a process appropriate to the received data and the identified posture of the computer, the transmitter having a sensor detecting a posture thereof, the transmitter comprising:

a transmission destination device determination section adapted to identify and designate a hand-held mobile device on a basis of the identified posture of the transmitter and an established line of sight from the information processor to the hand-held mobile device in real space, wherein said posture controls the line of sight;

a transmission data determination section adapted to determine data content to be transmitted to the hand-held mobile device on the basis of the identified posture of the transmitter after the hand-held mobile device is identified; and a transmission section adapted to transmit the data to the hand-held mobile device, wherein the data content includes missile data for a missile displayed in a virtual space generated by the computer, wherein a translucent orbit object is displayed in the virtual space and represents a potential orbit of the missile, wherein the information processor is carried by a first player and the hand-held mobile device is carried by a second player, wherein a position of the hand-held device in real space is acquired by said information processor and translated into a corresponding position in the virtual space, wherein the virtual space comprises a play image that includes an image captured and generated by a rear imaging section of the information processor at a given time interval, wherein the play image includes an image showing what a user of the information processor sees in the real world when looking in a direction of the line of sight from a viewpoint, wherein a field-of-view area is determined on the basis of the position of the viewpoint and the direction of the line of sight, and when the second player is present in the field-of-view area, the play image includes a picture of the second player in the form of a target player object, wherein the information processor is a game controller comprising directional keys, analog sticks, an L button and an R button, and a rear imaging section configured to capture an image for use as a background image, wherein a lock-on object is displayed on a display section of the information processor and the target player is locked onto when at least part of the target player object appears inside the lock-on object, wherein the target player object remains locked onto if the L button is pressed and held, wherein the missile's potential orbit as represented by the orbit object changes when the first player changes the posture of the information processor with the target player object locked onto, and wherein the missile's actual orbit in the virtual space is determined by the posture of the information processor at the time the first player uses the information processor to perform a missile firing operation.

10. The information processor of claim 1, wherein after the missile is fired a picture of the incoming missile is displayed on a display section of the hand-held mobile device based on the missile data, wherein the second player locks onto the incoming missile by adjusting the posture of the hand-held mobile device so that a line of sight direction is oriented toward the incoming missile and at least part of the picture of the incoming missile appears in a lock-on area in the display section, wherein an interceptor missile on a launch pad is displayed in the display section of the hand-held mobile device and when the second player launches the interceptor the virtual space shows a scene of the interceptor being fired from the launch pad, wherein the interceptor is arranged in the virtual space at a position along the orbit of the incoming missile and at a given distance from an end point of the orbit, wherein the interceptor moves along the orbit of the incoming missile in the direction opposite of the incoming missile and at a given speed in the virtual space.

* * * * *